(12) United States Patent
Pelini

(10) Patent No.: US 8,210,886 B1
(45) Date of Patent: Jul. 3, 2012

(54) JACK PLATE WITH LIGHT SOURCE

(76) Inventor: Steven Pelini, Tampa, FL (US)

( * ) Notice: Subject to any disclaimer, the term of this patent is extended or adjusted under 35 U.S.C. 154(b) by 184 days.

(21) Appl. No.: 12/658,746

(22) Filed: Feb. 16, 2010

(51) Int. Cl.
*B63H 20/08* (2006.01)

(52) U.S. Cl. .......................................................... 440/53

(58) Field of Classification Search ................ 440/61 R, 440/53
See application file for complete search history.

(56) References Cited

U.S. PATENT DOCUMENTS

| | | | |
|---|---|---|---|
| 2,615,122 A * | 10/1952 | Coombs | 33/348.2 |
| 3,502,861 A * | 3/1970 | Evans | 362/477 |
| 4,234,909 A * | 11/1980 | Cotroneo | 362/100 |
| 5,725,402 A | 3/1998 | Marsh | |
| 6,126,498 A * | 10/2000 | Icenogle et al. | 440/53 |
| 6,474,851 B1 * | 11/2002 | Baley | 362/477 |
| 7,291,852 B1 * | 11/2007 | Matlack et al. | 250/504 R |
| 7,520,644 B2 * | 4/2009 | Jordan et al. | 362/477 |

* cited by examiner

*Primary Examiner* — Daniel Venne
*Assistant Examiner* — Andrew Polay
(74) *Attorney, Agent, or Firm* — Edward P Dutkiewicz

(57) ABSTRACT

The jack plate has two vertically aligned side plates, a transom plate, and a splash plate. The jack plate has associated light source holes associated therewith. There are light sources, such as LED's contained with the light source holes of the jack plate. There is a travel stop block coupled to the jack plate transom plate.

18 Claims, 3 Drawing Sheets

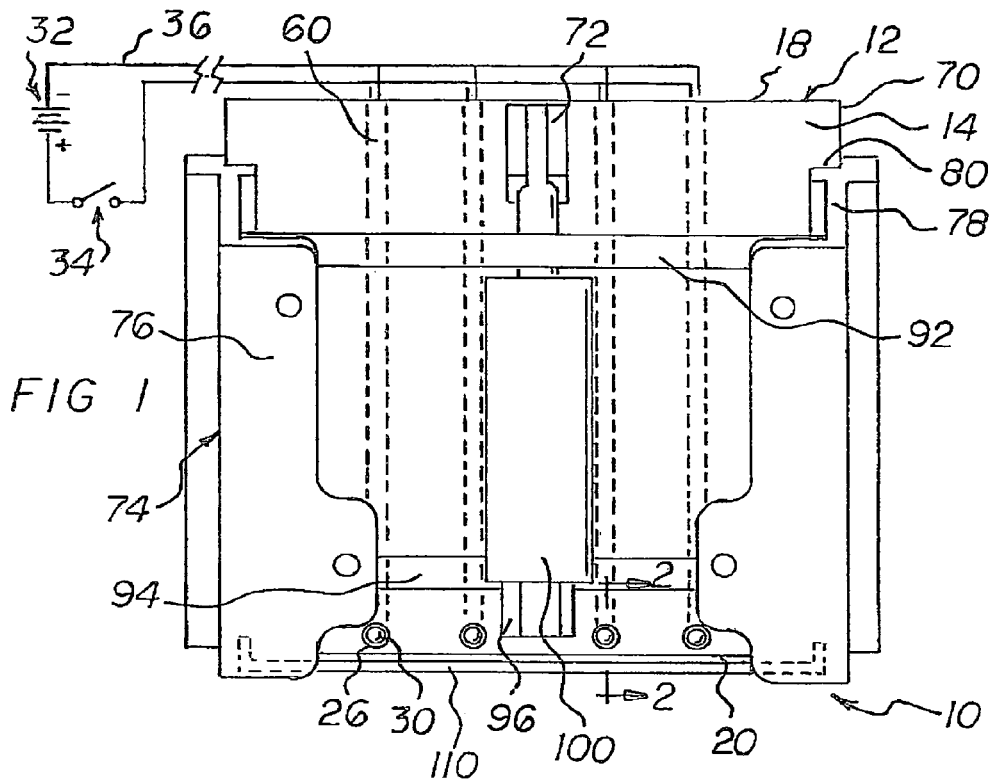
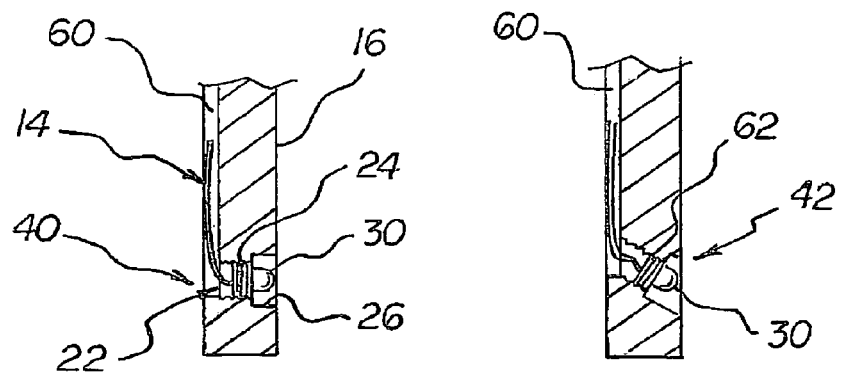
FIG 1
FIG 2
FIG 3

JACK PLATE WITH LIGHT SOURCE

BACKGROUND OF THE INVENTION

1. Field of the Invention

The present invention relates to a jack plate having an light source and more particularly relates to a jack plate having at least one light source, preferably an LED, attached to and inset into the jack plate, with the power source being remote from the LED and the power source operatively coupled to the LED with wiring and a switch.

2. Description of the Prior Art

The use of lighting in the aid of attracting fish to the area of the boat is well known in the prior art. More specifically, lighting is usually suspended from the hull of the boat, into the water, or slightly above the water, so as to attract fish to the area of the boat. The configurations of such light systems is known to consist basically of familiar, expected, and obvious structural configurations, notwithstanding the myriad of designs encompassed by the prior art.

While the prior art devices fulfill their respective, particular objectives and requirements, the prior art patents do not describe a jack plate having an inset LED for attracting fish to the location of the boat, in a safe, convenient and economical manner.

In this respect, the jack plate with light source, according to the present invention, substantially departs from the conventional concepts and designs of the prior art, and in doing so provides a device for using a light emitting diode inset into a jack plate of a boat, to attract fish to the location of the boat, in a safe, convenient and economical manner.

Therefore, it can be appreciated that there exists a continuing need for a new and improved jack plate with a light source, which can be used for attracting fish to the location of the boat, in a safe, convenient and economical manner. In this regard, the present invention substantially fulfills this need.

SUMMARY OF THE INVENTION

In view of the foregoing disadvantages inherent in the known types of fishing light devices, of known designs and configurations, now present in the prior art, the present invention provides an improved jack plate with light source. As such, the general purpose of the present invention, which will be described subsequently in greater detail, is to provide a new and improved jack plate with light source which has all the advantages of the prior art and none of the disadvantages.

To attain this, the present invention essentially comprises a jack plate with light source. First provided is a generally rectilinear transom plate. The transom plate has a forward surface and a rearward surface. The forward surface is placed in contact with the boat transom. A light hole passes through the transom plate, from the forward surface to the rearward surface. The light hole is partially threaded and has a first diameter. The rearward surface of the transom plate has an inset associated with the light hole. The inset has a second diameter, with the second diameter being greater than the first diameter.

The transom plate has a slot or groove associated with each light hole. The slot or groove allows for the placement of wires between the transom plate and the transom of the boat, preventing pinching of the wires by the transom and the transom plate.

The transom plate has a first thickness, or first external dimension, referred to as the edge. The transom plate has two side edges, a top edge, and a bottom edge. The transom plate is position-able on the transom of a boat. The transom plate has a plurality of mounting bolt holes there through. The associated transom bolts (not shown, but known in the art) pass through the transom plate, and through the transom of a boat. The transom plate has a plurality of thread block holes there through.

The transom plate has an associated hydraulic cylinder mounting location, comprising a pair of upper cylinder, ram attachment tabs.

Next provided is a pair of similarly configured vertically disposed side rails. The side rails are mirror images of each other, each side plate having a front, a rear, a top, a bottom, an inner surface, and an outer surface. Each of the side rails has a forward edge and a rearward edge.

The side rails are in a generally trapezoidal configuration when viewed from the side, and an L-shaped configuration when viewed from above, or from top down. Each of the side rails has a short leg portion and a long leg portion. The short leg portion runs from the side plate, inwardly. The long leg portion runs from back to front, with the front having a generally rectangular enlargement running the length of the forward edge, from top to bottom.

The rectangular enlargement has a groove running from top to bottom. The rectangular enlargement has a grease fitting communicating with the surface of the groove. The rectangular enlargement groove has a second internal width, or dimension. The groove has an associated groove insert. The rectangular enlargement groove insert has a grease hole there through. The rectangular enlargement groove insert grease hole aligns with the grease fitting of the rectangular enlargement of the side rails.

The rectangular enlargement groove insert has a generally C-shaped configuration having an internal width, or dimension, and an external width, or dimension, and a depth. This configuration forms a recess. The internal width has a third dimension. The third dimension is larger than the first dimension of the transom side edge. This allows the transom side edge to be nested within the recess of the groove insert. The rectangular enlargement groove insert also has a fourth external dimension. The fourth external dimension is smaller than the second internal dimension of the side rail groove. This allows the insert to be nested within the side rail enlargement groove located in the forward end of the long leg portions of the side rail. This sizing allows the insert to be nested within the rectangular enlargement, and allows the side rail to slide up and down the length of the insert.

Each of the long leg portions of each of the side rails has a plurality of cross strut holes there through.

Each of the side rails has a rearwardly located short leg. The short leg of the side rail runs inwardly from each of the side rails, and forms a surface for receiving an outboard motor mount. Each of the short legs of the side rails has a forward surface and a rearward surface and a thickness there between. Each of the short legs of the side rails has a plurality of motor mount bolt holes there through.

Next provided are a plurality of cross struts being an upper cross strut and a lower cross strut. The cross struts each have a generally solid cylindrical configuration (cylindrical being defined as continuous and of a single shape, not confined to being round). The lower cross strut has an associated pair of hydraulic cylinder mounting tabs coupled there to. The tabs are configured to couple to the hydraulic cylinder so at to allow the sliding movement of the transom and the lower strut, relative to each other as the hydraulic ram is extended or retracted. The cross struts couple the two side rails to form a rigid structure.

Provided last is a hydraulic cylinder. The hydraulic cylinder has a base and a ram. The cylinder base has an attachment protrusion and the ram has an attachment protrusion. The base protrusion is configured to fit between the tabs of the lower strut, and be bolted there to. The ram protrusion is configured to fit between the tabs of the transom plate, and be bolted there to.

The hydraulic cylinder has an associated reservoir (not known but well known in the art) a pair of fluid lines (not shown but well known in the art) and an associated valve (not shown but well known in the art). The pump has a power supply associated there with.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved jack plate with light source which has all of the advantages of the prior art stop systems of known designs and configurations and none of the disadvantages.

It is another object of the present invention to provide a new and improved jack plate with light source which may be easily and efficiently manufactured and marketed.

It is further object of the present invention to provide a new and improved jack plate with light source which is of durable and reliable constructions.

An even further object of the present invention is to provide a new and improved jack plate with light source which is susceptible of a low cost of manufacture with regard to both materials and labor, and which accordingly is then susceptible of low prices of sale to the consuming public, thereby making such jack plate with light source economically available to the buying public.

Lastly, it is an object of the present invention to provide a new and improved jack plate with light source comprising a transom plate having associated light sources, and a pair of similarly configured side rails that are mirror images of each other. Also provided are a plurality of cross struts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the primary and preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevational view of the plate from a position rearward of the plate. Note the location of the light sources, with the groove, or inset, in the forward surface of the transom plate being shown in phantom.

FIG. 2 is a partial view of the system taken along line 2-2 of FIG. 1, showing the light hole to be oriented perpendicular to the forward and rearward surfaces of the transom plate.

FIG. 3 is a partial view of the system taken along line 2-2, showing the light hole to be oriented at an angle to the forward and rearward surfaces of the transom plate.

The same reference numerals refer to the same parts throughout the various Figures.

DESCRIPTION OF THE PREFERRED EMBODIMENT

Figure 4:
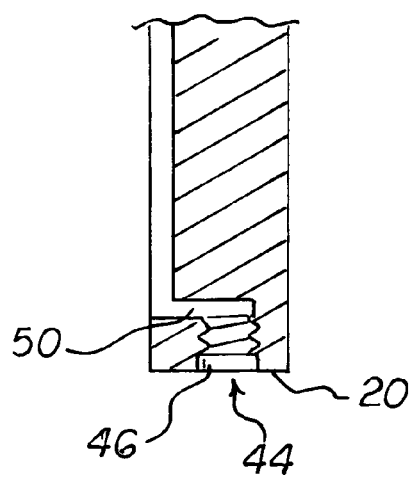
FIG. 4 is a close up cross section of the lower edge of the transom plate, showing the light hole, or "recess", and the wire hole and the groove, or slot. The wire hole may be perpendicular to the recess, or at an angle to the recess. In this embodiment a thread is used to couple the light source to the light hole, but other securement devices, such as snap rings or clips may be used.
Figure 5:
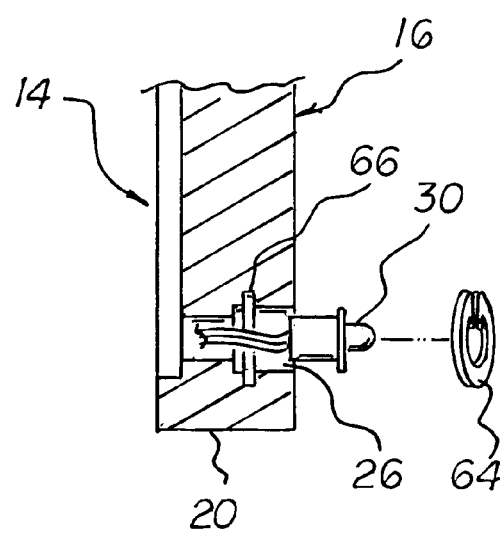
FIG. 5 is a close up cross section of the lower edge of the transom plate, showing the light hole, or "recess", and the wire hole and the groove, or slot. The wire hole may be parallel to the recess, or at an angle to the recess. In this embodiment a snap ring and snap ring groove is used to couple the light source to the light hole, but other securement devices, such as threads or clips may be used to accomplish the secure coupling of the light source to the light hole.
Figure 6:
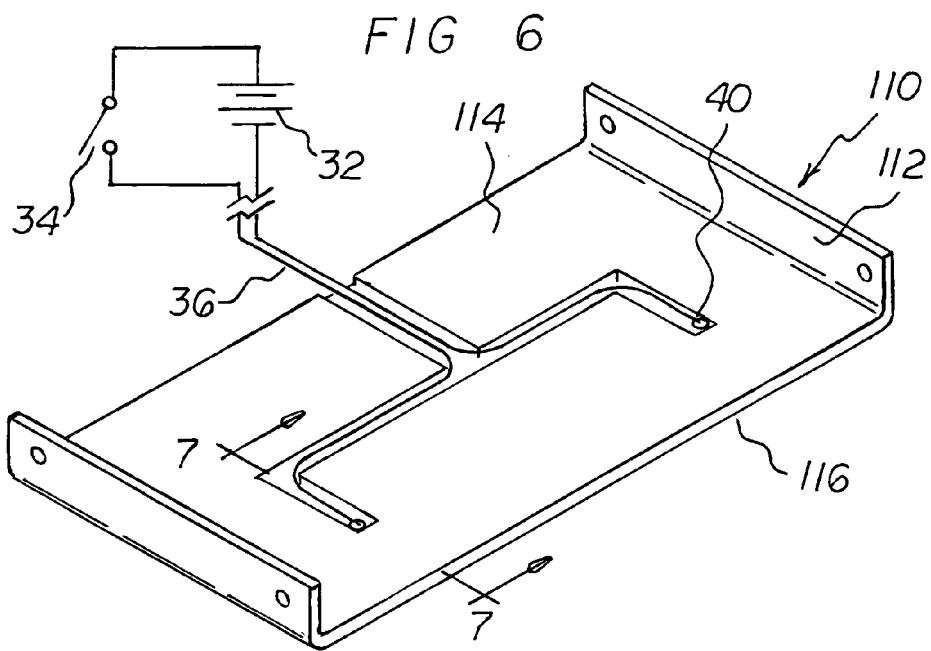
FIG. 6 is a perspective view of the jack plate splash pan, with the splash pan containing the lighting sources.
Figures 7, 8:
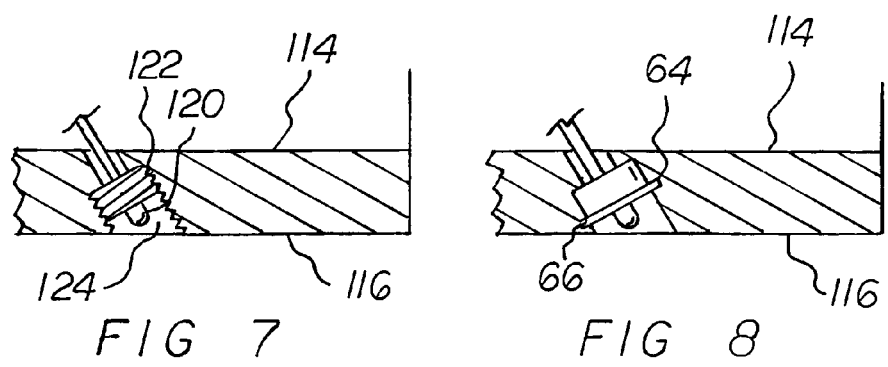
FIG. 7 is a cross sectional view taken along line 7-7 of FIG. 6.
FIG. 8 is another variation of the splash pan light, wherein the light is clipped into the splash pan using a groove and snap ring to secure the light therein.

With reference now to the drawings, and in particular to FIG. 1 thereof, the preferred embodiment of the new and improved jack plate with light source embodying the principles and concepts of the present invention and generally designated by the reference numeral 10 will be described.

First provided is a generally rectilinear transom plate 12. The transom plate has a forward surface 14 and a rearward surface 16. The transom plate has an upper edge 18 and a lower edge 20. The forward surface is placed in contact with a boat transom (not shown). A light hole 22 passes through the transom plate, from the forward surface to the rearward surface. The light hole is partially threaded 24 and has a first diameter. The rearward surface of the transom plate has an inset 26 associated with the light hole. The inset has a second diameter, with the second diameter being greater than the first diameter.

The forward surface of the transom plate and the rearward surface of the transom plate lie parallel with each other.

Each light hole, in that there may be one, or more than one, has an associated light source 30. The light source has an associated battery 32, such as the battery for the operation of the boat's engine, and a switch 34, so as to allow the user to turn the light source on or off. Each light source has an associated wire 36 to couple the light source to the switch, to the ground, and to the battery. The light source may be a light emitting diode, or a bulb which has a filament. The preferred embodiment uses a light emitting diode as the light source.

The light source may be white light or of a specific color, or wavelength.

The light hole and light source may be oriented to be perpendicular 40 to the forward surface of the transom plate and perpendicular to the rearward surface of the transom plate.

In another configuration, the light hole and light source may be oriented at an angle 42 to the forward surface of the transom plate and at an angle to the rearward surface of the transom plate.

By placing the light source at an angle to the transom plate, in a downward direction, the light source has a lesser angle to the water's surface, and hence reflection is lessened.

In still another configuration, the light hole and light source may be oriented in a downward position 44. In this configuration the light hole forms a nest 46. The light source is then located within the nest, that is, within a recess within the transom plate lower edge. In this configuration the light hole and light source are oriented parallel with the forward surface of the transom plate and parallel with the rearward surface of the transom plate. The transom plate is drilled to a size sufficient to accept the light source.

A wire hole 50 is located at the uppermost extent of the transom plate lower edge recess. The wire hole runs from the light hole, or "recess", to the forward surface of the transom plate. The word recess and hole are used interchangeably.

There is a groove 60, or "slot", then located at the point where the wire hole reaches the forward surface of the transom plate. The groove, or slot, then travels along the forward surface of the transom plate. The groove, or slot, forms a nest for the light source wires, to prevent the wires from being crushed or disrupted by compression between the boat transom and the transom plate. The words groove and slot are used to be interchangeable with each other.

Each light hole has an associated locking device 62, or "securement device" for securing the light source within the light hole. In the preferred embodiment the locking device is a light source with a male thread and the light hole has a female thread which is configured to accept and mate with the thread of the light source.

In other configurations the locking device may be a snap ring 64 and a snap ring groove 66, with the groove being located within the light hole and on the light source outer periphery. In this configuration a snap ring locks the light source in position. This embodiment is well known in the art and no further description is deemed to be warranted to allow one skilled in the art to employ a snap ring to hold the light source in position within the light hole.

Another configuration may be a detent and recess arrangement, with the detent being located on the sight source and the recess being within the light source hole periphery, or wall.

The transom plate has a slot or groove associated with each light hole. The slot, or groove, allows for the placement of wires between the transom plate and the transom of the boat, preventing pinching of the wires by the transom and the transom plate. Upon installation a user may insert the wires into the groove and then fill the groove with a flexible material, such as silicone caulk or adhesive (not shown, but well known in the art). Collectively, caulks and adhesives are herein referred to as "fillers". Singularly, each is considered to be a "filler".

The transom plate is then secured to the boat transom. In this manner, the silicone caulk will fill the groove, and immobilize the wires, while coating the wires with a water resistant encapsulation. The silicone caulk will also solidify and prevent the wires from moving within the groove. This immobilization will decrease the occurrence of wire movement and resulting wire fraying or abrasion.

The transom plate has a first thickness, or first external dimension, referred to, above, as the edge. The transom plate has two side edges 70, a top edge, and a bottom edge. The transom plate is position-able on the transom of a boat. The transom plate has a plurality of mounting bolt holes there through (not shown, but well known in the art). The associated transom bolts (not shown, but known in the art) pass through the transom plate, and through the transom of a boat. The transom plate has a plurality of thread block holes there through.

The transom plate has an associated hydraulic cylinder mounting location, comprising a pair of upper cylinder, ram attachment tabs 72.

Next provided is a pair of similarly configured vertically disposed side rails 74. The side rails are mirror images of each other, each side plate having a front, a rear, a top, a bottom, an inner surface, and an outer surface. Each of the side rails has a forward edge and a rearward edge.

The side rails are in a generally trapezoidal configuration when viewed from the side, and an L-shaped configuration when viewed from above, or from top down. Each of the side rails has a short leg portion 76 and a long leg portion. The short leg portion runs from the side plate, inwardly. The long leg portion runs from back to front, with the front having a generally rectangular enlargement running the length of the forward edge, from top to bottom.

The rectangular enlargement has a enlargement groove 80 running from top to bottom. The rectangular enlargement has a grease fitting communicating with the surface of the enlargement groove. The rectangular enlargement groove has a second internal width, or dimension. The enlargement groove has an associated enlargement groove insert. The rectangular enlargement groove insert has a grease hole there through. The rectangular enlargement groove insert grease hole aligns with the grease fitting of the rectangular enlargement of the side rails.

The rectangular enlargement groove insert has a generally C-shaped configuration having an internal width, or dimension, and an external width, or dimension, and a depth. This configuration forms a recess. The internal width has a third dimension. The third dimension is larger than the first dimension of the transom side edge. This allows the transom side edge to be nested within the recess of the groove insert. The rectangular enlargement groove insert also has a fourth external dimension. The fourth external dimension is smaller than the second internal dimension of the side rail groove. This allows the insert to be nested within the side rail enlargement groove located in the forward end of the long leg portions of the side rail. This sizing allows the insert to be nested within the rectangular enlargement, and allows the side rail to slide up and down the length of the insert.

The insert is fabricated of a synthetic material, such as nylon or other plastic. This combination of plastic and metal provides for a smooth, lubricious interface between the transom plate and the side rails.

Each of the long leg portions of each of the side rails has a plurality of cross strut holes there through.

Each of the side rails has a rearwardly located short leg. The short leg of the side rail runs inwardly from each of the side rails, and forms a surface for receiving an outboard motor mount. Each of the short legs of the side rails has a forward surface and a rearward surface and a thickness there between. Each of the short legs of the side rails has a plurality of motor mount bolt holes there through.

Next provided are a plurality of cross struts being an upper cross strut 92 and a lower cross strut 94. The cross struts each have a generally solid cylindrical configuration (cylindrical being defined as continuous and of a single shape, not confined to being round). The lower cross strut has an associated pair of hydraulic cylinder mounting tabs 96 coupled there to. The tabs are configured to couple to the hydraulic cylinder so at to allow the sliding movement of the transom and the lower strut, relative to each other as the hydraulic ram is extended or retracted. The cross struts couple the two side rails to form a rigid structure.

A splash plate 110 is next provided. The splash plate has a generally rectilinear configuration with a pair of turned edges 112. The splash plate is coupled to the side rails so as to minimize the flow of water through the jack plate.

In a variation of the jack plate with a light source, the light source is coupled to the splash plate. In this configuration, the splash plate has an upper surface 114 and a lower surface 116. There is a peripheral edge between the upper and lower surfaces. The turned ends of the splash plate are coupled to the side rails of the jack plate. A light hole 120 passes through the splash plate, from the upper surface to the lower surface. The light hole is partially threaded 122 and has the first diameter. The lower surface of the splash plate has an inset 124 associated with the splash plate light hole. The inset has the second diameter, with the second diameter being greater than the first diameter.

The upper surface of the splash plate and the lower surface of the splash plate lie generally parallel with each other.

Each light hole, in that there may be one, or more than one, has an associated light source. The light source has an associated battery 32, such as the battery for the operation of the boat's engine, and a switch 34, so as to allow the user to turn the light source on or off. Each light source has an associated wire 36 to couple the light source to the switch, to the ground, and to the battery. The light source may be a light emitting diode, or a bulb which has a filament. The preferred embodiment uses a light emitting diode as the light source.

The light source may be white light or of a specific color, or wavelength.

The light hole and light source may be oriented to be perpendicular 40 to the upper surface of the splash plate and perpendicular to the lower surface of the splash plate.

In another configuration, the light hole and light source may be oriented at an angle to the upper surface of the splash plate and at an angle to the lower surface of the splash plate.

There is a travel stop (not shown) which is bolted to the transom plate. There are a pair of threaded holes in the travel stop, and a pair of matching bolt holes in the transom plate. A pair of bolts is used to couple the travel stop to the transom plate.

Provided last is a hydraulic cylinder 100. The hydraulic cylinder has a base and a ram. The cylinder base has an attachment protrusion and the ram has an attachment protrusion. The base protrusion is configured to fit between the tabs of the lower strut, and be bolted there to. The ram protrusion is configured to fit between the tabs of the transom plate, and be bolted there to.

The hydraulic cylinder has an associated reservoir (not known but well known in the art) a pair of fluid lines (not shown but well known in the art) and an associated valve (not shown but well known in the art). The pump has a power supply associated there with.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A jack plate with light source comprising:
    a transom plate having a forward surface and a rearward surface;
    the jack plate having at least one associated light hole and at least one associated light source, the light source having an associated battery and an associated on-off switch;
    the light hole associated light source being associated with and at least partially contained within the light hole;
    each light hole being a passageway through the transom plate, the light hole running through the transom plate from the forward surface of the transom plate to the rearward surface of the transom plate, the light hole having a first diameter and a second diameter with the second diameter being greater than the first diameter;
    a pair of side rails being mirror images of each other; and
    a plurality of cross struts.

2. The jack plate with light source as described in claim 1 wherein the jack plate further comprises the first diameter of the light hole running from the forward surface of the transom plate and the second diameter of the light hole running from the rearward surface of the transom plate.

3. The jack plate with light source as described in claim 2 wherein the jack plate further comprises each light hole having an associated locking device for securing the light source within the light hole.

4. The jack plate with light source as described in claim 3 wherein the jack plate further comprises the locking device being a male thread and female thread wherein the light source has the male thread and the light source hole has the female thread, with the light source being threaded into the light source hole so as to secure the light source within the light source hole.

5. The jack plate with light source as described in claim 1 wherein the jack plate further comprises the light hole being oriented perpendicular to the forward surface of the transom plate and perpendicular to the rearward surface of the transom plate.

6. The jack plate with light source as described in claim 1 wherein the jack plate further comprises the light hole being oriented at an angle to the forward surface of the transom plate and at an angle to the rearward surface of the transom plate.

7. The jack plate with light source as described in claim 1 wherein the jack plate further comprises the light hole being oriented parallel to the forward surface of the transom plate and parallel to the rearward surface of the transom plate.

8. The jack plate with light source as described in claim 7 wherein the jack plate further comprises the light hole having an associate wire hole, with the wire hole forming a communication of the light hole with the forward surface of the transom plate.

9. The jack plate with light source as described in claim 8 wherein the wire hole communicates with a groove, the groove being located within the forward surface of the transom plate.

10. The jack plate with light source as described in claim 9 wherein there is a filler used in association with the groove to protect a wire nested within the groove.

11. The jack plate with light source as described in claim 1 wherein the light source is an light emitting diode.

12. The jack plate with light source as described in claim 1 wherein the light source is a light bulb having a filament.

13. The jack plate with light source as described in claim 1 wherein the light source is of a single color.

14. The jack plate with light source as described in claim 1 with the system further comprising:

the side rails having a generally trapezoidal configuration when viewed from the side, and an L-shaped configuration when viewed from above from top down, each of the side rails having a short leg portion and a long leg portion with the short leg portion running from the side rail, inwardly, the long leg portion running from the rear to the front;

an enlargement groove insert having a grease hole aligning with the grease fitting of a rectangular enlargement of the side rail, the groove insert having a generally C-shaped configuration with an internal width and an external width and a depth, forming a recess therein;

the cross struts comprising two rectangular shaped struts having threaded bolt holes on each of the two ends and two round shaped struts with each round strut having two ends with each side having a protruding thread, the protruding thread being sized to fit into the apertures located in the side rails, the cross struts comprising an upper strut and a lower strut, the struts coupling the two side rails to form a rigid structure;

and a splash plate having a generally rectilinear configuration with a pair of turned edges with the splash plate being coupled to the side rails.

15. The jack plate with light source as described in claim 1 wherein the jack plate further comprises a splash plate having an upper surface and a lower surface with a peripheral edge there between, with each light hole being a passageway through the splash plate, the light hole having an associated light source with the light source being associated with and at least partially contained within the light hole, the light hole running through the splash plate from the upper surface of the splash plate to the lower surface of the splash plate.

16. The jack plate with light source as described in claim 15 wherein the jack plate further comprises each light hole having a first diameter and a second diameter with the second diameter being greater than the first diameter, and each light hole having an associated locking device for securing the light source within the light hole.

17. The jack plate with light source as described in claim 16 wherein the jack plate further comprises the locking device being a male thread and female thread wherein the light source has the male thread and the light source hole has the female thread, with the light source being threaded into the light source hole so as to secure the light source within the light source hole.

18. The jack plate with light source as described in claim 16 wherein the jack plate further comprises the locking device being a snap ring, with the light source hole having a snap ring receiving groove therein so as to secure the light source within the light source hole.

* * * * *